United States Patent [19]

Brearley et al.

[11] Patent Number: 4,547,022
[45] Date of Patent: Oct. 15, 1985

[54] HYDRAULIC ANTI-SKID BRAKING SYSTEMS FOR VEHICLES

[75] Inventors: Malcolm Brearley, Solihull; Glyn P. R. Farr, Leek Wootton, both of England

[73] Assignee: Lucas Industries Public Limited Company, United Kingdom

[21] Appl. No.: 570,752

[22] Filed: Jan. 16, 1984

[30] Foreign Application Priority Data

Jan. 28, 1983 [GB] United Kingdom ............... 8302458

[51] Int. Cl.$^4$ ........................... B60T 8/02; B60T 8/26
[52] U.S. Cl. .................................. 303/6 C; 303/111; 303/115; 303/116; 303/92
[58] Field of Search ............. 303/115, 111, 6 C, 6 R, 303/6 A, 91, 92, 93, 96, 98, 100, 102, 110, 113–114, 116–119; 188/345, 181 C, 181 A, 181 R

[56] References Cited

U.S. PATENT DOCUMENTS

| | | | |
|---|---|---|---|
| 4,022,514 | 5/1977 | Kondo et al. | 303/115 |
| 4,050,748 | 9/1977 | Belart | 303/115 X |
| 4,229,049 | 10/1980 | Ando | 303/115 X |

Primary Examiner—Douglas C. Butler
Attorney, Agent, or Firm—Laff, Whitesel, Conte & Saret

[57] ABSTRACT

An 'X' split hydraulic anti-skid braking system for a four-wheel vehicle, incorporates four skid sensors for providing skid signals dependent upon the behavior of respective wheel, a modulator provided in each circuit to modulate the supply of fluid to the brakes of the respective circuit, a control module for operating at least one of the modulators in accordance with the magnitude and nature of the skid signal or signals, and apportioning valves disposed in the lines between the modulators and the brakes on the rear wheels. The control module is constructed and arranged to ignore a skid signal from a sensor on a rear wheel until a skid signal is also received from the sensor on the other rear wheel, whereafter the control module is operative to operate one of the two modulators.

10 Claims, 4 Drawing Figures

HYDRAULIC ANTI-SKID BRAKING SYSTEMS FOR VEHICLES

SPECIFIC DESCRIPTION

This invention relates to hydraulic anti-skid braking systems for vehicles of the kind in which a supply of hydraulic fluid under pressure, for example from an hydraulic master cylinder, is adapted to be supplied to the actuator of a wheel brake through a modulator which is adapted to modulate the pressure applied to the actuator in accordance with a skid signal from skid sensing means.

When an anti-skid braking system of the kind set forth comprises first and second brake-applying circuits, in which the first circuit comprises a first source of brake-applying fluid, and a first connection between the first source and the brake on one front wheel of a vehicle and the brake on the diagonally opposite rear wheel, and the second circuit comprises a second source of brake-applying fluid, and a second connection between the second source and the brake on the other front wheel of the vehicle and the brake on the diagonally opposite rear wheel, such a system is known as an "X" split and difficulty is experienced in controlling the behaviour of the braked wheels relative to each other unless a separator modulator is provided for each wheel.

It has been proposed to provide a single modulator for each circuit, two sensors, each for providing a skid signal dependent upon the behaviour of a respective one of the front wheels, and an electronic control module which receives the skid signals from the sensors and, depending upon the magnitude and nature of same, is operative to operate a respective modulator to modulate the pressure of hydraulic fluid supplied to the two brakes of the respective circuit.

In such a known "X" split system it is essential to ensure that the brake-applying fluid supplied to the brakes of one circuit is released before the brake on the rear wheel of that circuit can lock otherwise the stability of the vehicle will be seriously effected. To an extent this can be achieved by providing an apportioning valve in the two connections, between the two brakes, and setting the apportioning valve to ensure that the front wheels will lock before the rear wheels. Unfortunately, to ensure that locking of the rear wheels cannot occur, it is necessary to downgrade and underbrake the rear wheels, which reduces the effective braking effort under normal conditions. However, due to variations in the co-efficients of friction of the linings of the brakes with temperature there still remains a tendency, under certain conditions, for the rear wheels to lock before the front wheels.

According to our invention in an anti-skid braking system for a four wheel vehicle having brakes on the front and rear wheels, the system comprises first and second brake-applying circuits, the first circuit comprising a first source of brake-applying fluid, and a first connection between the first source and the brake on one front wheel and the brake on the diagonally opposite rear wheel, and the second circuit comprising a second source of brake-applying fluid, and a second connection between the brake on the other front wheel and the brake on the diagonally opposite rear wheel, a first modulator located in the first connection for modulating the supply of fluid from the first source to both the brakes on the said one front wheel and the diagonally opposite rear wheel, a second modulator located in the second connection for modulating the supply of fluid from the second source to both the brakes on the said other front wheel and the diagonally opposite rear wheel, four skid sensors, each for providing a skid signal dependent upon the behaviour of a respective wheel, a control module for operating at least one of the modulators in accordance with the magnitude or nature of the skid signal or signals, and apportioning valves disposed in the lines between the modulators and the brakes on the rear wheels, the control module being constructed and arranged to ignore a skid signal from a sensor on a rear wheel unitl a skid signal is also received from the sensor on the other rear wheel, whereafter the control module is operative to operate one of the two modulators.

This caters for the situation in which a sensor of a rear wheel brake emits a premature skid signal due to the co-efficient of the brake lining tendency to cancel the apportioning effect of the respective apportioning valve and therefore ensures that the brakes cannot be released prematurely. Otherwise a skid signal from a sensor on one rear wheel would immediately release, not only the brake on that wheel, but also the brake on the diagonally opposite front wheel which, under such circumstances, would probably be being applied effectively, thereby reducing the braking effort unnecessarily and causing instability.

The control module is preferably arranged such that, in response to a signal from a sensor of one rear wheel, the threshold of the control module is automatically reduced. This ensures that one of the two modulators will then be operated earlier in response to a reduced signal from the sensor on the other rear wheel.

Preferably each modulator is driven from the respective front wheel of a front wheel drive vehicle, or through a drive from the output shaft of a gear box of a rear wheel drive vehicle.

This provides the energy for re-applying the brake following skid correction and ensures that the brakes can be re-applied when the vehicle has forward motion.

In the former case, which is preferred, the modulator is operable to re-apply the brakes only when the wheel is rotating following correction of a skid, and no additional time delay to prevent premature brake re-application has to be provided.

Should a drive to one of the modulators fail, we may arrange for the control module to shut down the system with the driver being provided with a suitable warning.

Two embodiments of our invention are illustrated in the accompanying drawings in which.

Figure 1:
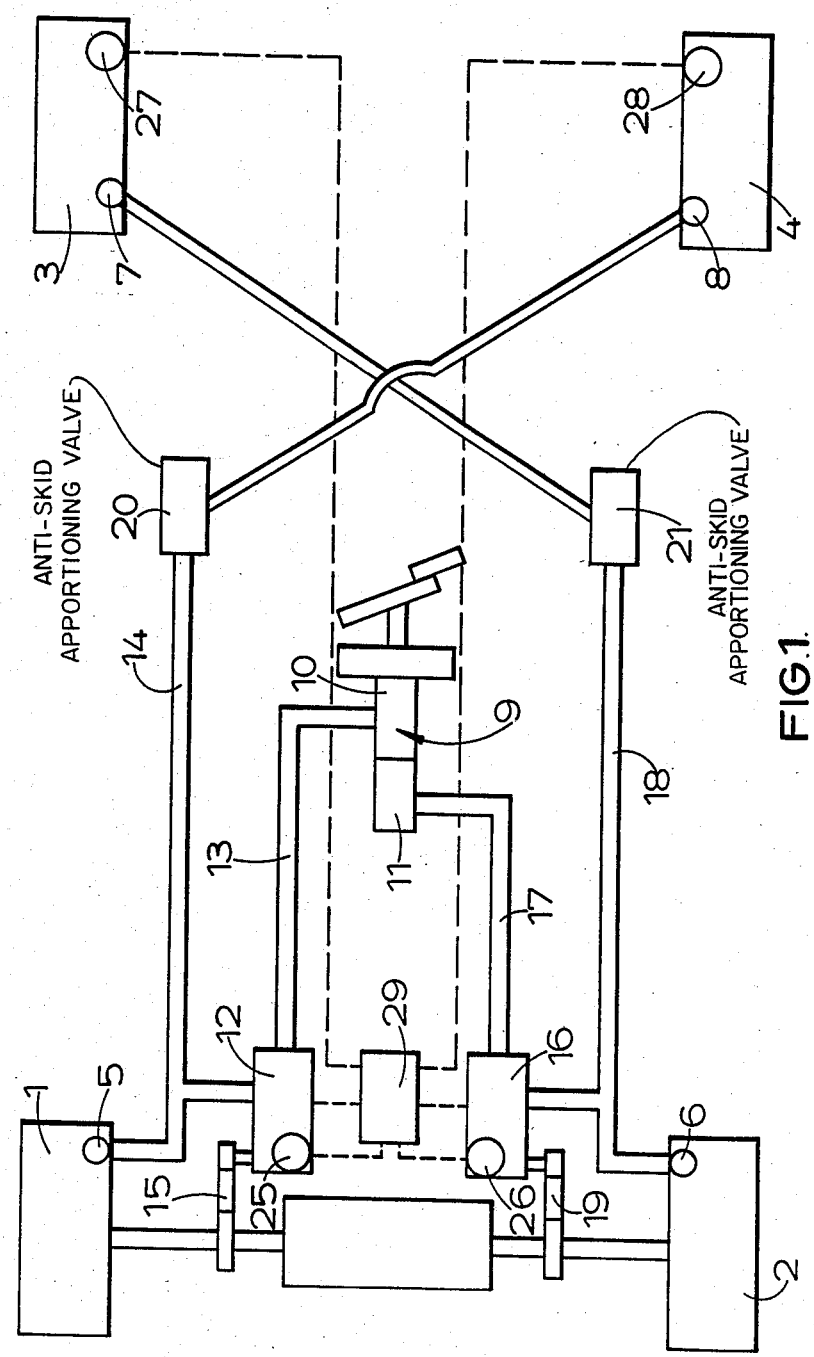
FIG. 1 is a layout of an "X" split hydraulic anti-skid braking system for a four wheel vehicle.

The braking system illustrated in the layout of FIG. 1 comprise two separate hydraulic brake-applying circuits for a vehicle of a front wheel drive type having two front wheels 1, 2 and two rear wheels 3, 4.

The wheels 1 and 2 are adapted to be braked by respective brakes 5 and 6, and the wheels 3 and 4 by respective brakes 7 and 8.

A pedal-operated master cylinder 9 has two pressure spaces 10 and 11.

The pressure space 10 is connected to a brake-pressure modulator 12 through a pipe-line 13 and the modulator 12, in turn, is connected to the brake 5 on the front wheel 1 and to the brake 8 on the diagonally opposite rear wheel 4 through a common pipe-line 14. The modulator 12 is driven through a drive 15 from the front wheel 1.

The pressure space 11 is connected to a brake-pressure modulator 16 through a pipe-line 17, and the modulator 16, in turn, is connected to the brake 6 on the front wheel 2 and the brake 7 on the diagonally opposite rear wheel 3 through a common pipe-line 18. The modulator 16 is driven through a drive 19 from the front wheel 2.

Figure 2:
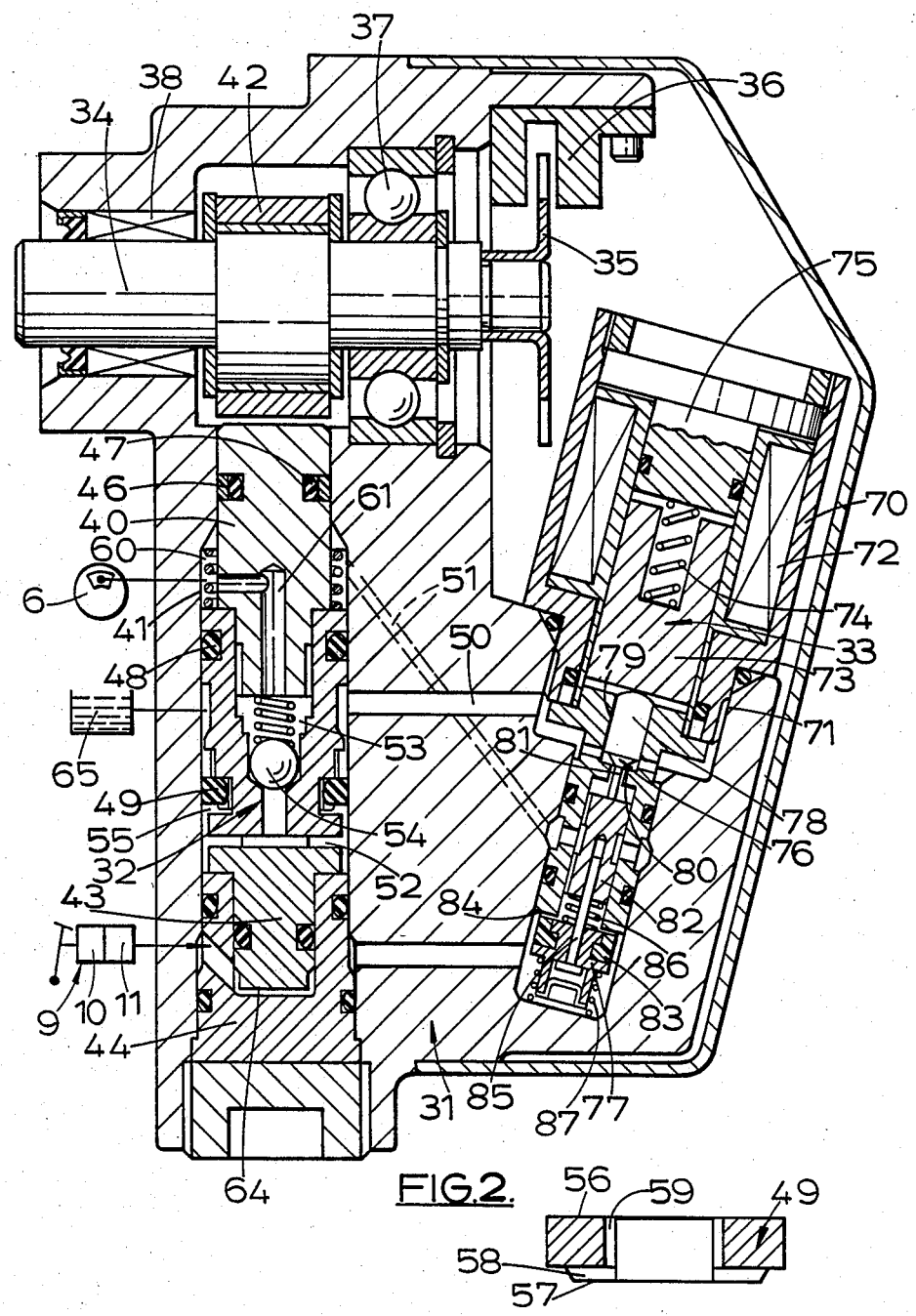
FIG. 2 is a section through a modulator assembly for the hydraulic anti-skid braking system of FIG. 1.
Figure 3:
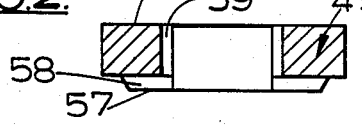
FIG. 3 is a section through a seal carried by the plunger of the pump of FIG. 2.

Each modulator 12, 16 is conveniently of the same construction as the modulator assembly illustrated in FIGS. 2 and 3 of the accompanying drawings.

The assembly illustrated in FIGS. 2 and 3 of the drawings comprises a housing 31 incorporating an hydraulic pump 32, and a solenoid-operated valve assembly 33. A longitudinally extending shaft 4 projects at opposite ends from the housing and at one end carries a toothed disc 35 forming part of an opto-sensor 36 carried by the housing 31 and defining the sensor 26. The shaft 34 is journalled for rotation in spaced bearings 37 and 38 in the housing 1 and is driven from the drive 19.

The pump 32 comprises a plunger 40 of stepped outline which works in a stepped bore 41 in the housing 31 and the inner end of smaller area is engageable with a drive mechanism comprising a ring 42 which is freely rotatable on an eccentric portion of the shaft 34. At its end of greater area the plunger 40 is adapted to be engaged by a drive piston 43 working in the bore of sleeve 44 of cup-shaped outline which acts as a closure for the end of the bore 41 which is of greater area. The end of the drive piston 43 remote from the plunger 40 is exposed to the pressure in the pressure space 11 of the hydraulic master cylinder 9.

The inner end portion of the plunger 40, which is of smaller area carries an annular sealing ring 46 backed by an 'O' ring seal 47, and the portion which is of greater diameter carries, at axially spaced positions, an 'O' ring seal 48 and a lip seal 49. The seals 48 and 49 are disposed on opposite sides of a passage 50 leading to the solenoid-operated valve 33, irrespective of the position of the plunger 40 within the bore 41, and the seal 46 and the adjacent 'O' ring seal 48 are also disposed on opposite sides of a passage 51 leading to the solenoid-operated valve 33. A secondary working chamber 52 is defined by the annular volume bounded by the bore 41, the plunger 40, the seal 48 and the seal 49.

A primary working chamber 53 is defined in the plunger 40 between a first one-way valve 54 in the plunger 40, the drive piston 43, and a second one-way valve constituted by the seal 49.

The lip seal 49, which is illustrated in detail in FIG. 3, comprises an annular ring of elastomeric material which is received in an annular groove 55 in the plunger 40. The groove 55 is parallel sided and is of an axial length greater than the thickness of the ring. Opposite faces 56 and 57 of the ring are respectively planar and of reduced area, with the face 57 of reduced area being provided with at least one diametrical slot 58 which communicates with passages 59 in the inner peripheral edge of the ring 19. The planar face 56 is adapted to seal against the adjacent, inner, face of the groove 55 to prevent flow from the secondary chamber 52 into the primary chamber 53.

The passage 51 leads into an annular outlet chamber 60 defined between the steps in diameters of the plunger 40 and the bore 41. The chamber 60 is in open communication with the working chamber 53 through connecting passages 61 in the plunger 40, and the chamber 60 is also connected to the brakes 6 and 7.

The solenoid-operated valve assembly 33 comprises a stepped body 70 which is received at its inner end in a stepped bore 71 in the housing 31. A coil 72 which is adapted to be energised by electrical signals generated by an electronic control module 29 is housed in the body 70 and an armature 73 movable axially in response to energisation of the coil 71 is normally urged inwardly by means of a spring 74 which abuts against a plug 75 at the outer end of the body 70. The armature 73 is adapted to control operation of a dump valve 76 and of an isolating valve 77.

The dump valve 76 comprises a valve head 78 which is guided to slide in a bore 79 in the body 70. The armature 73 acts on one end of the head 78 normally to urge the opposite end into engagement with a seating 80 to isolate the brakes 6, 7 from a reservoir 65 by closing off the passage 50. In this position the head 78 acts through a reduced diameter strut 81, passing through the seating 80, and an enlarged head 82 in order to hold the isolating valve 77 in an open position so that the master cylinder 9 is in communication with the brakes 6, 7 through a chamber 64, to which the drive piston 43 is exposed, and the passage 51.

The isolating valve 77 comprises a head 83 for engagement with a seating 84 defined by a face at the inner end of the body 70, and the head 83 is supported by a stem 85 which is guided to slide in a bore in the head 82 to form a lost-motion connection therebetween. Normally, in the position shown, the head 83 is held away from the seating 84 by means of a caged spring 86 which abuts between adjacent ends of the heads 82 and 83 and acts against the force in a weaker return spring 57.

In a normal inoperative "brakes-off" position shown in the drawing the armature 73 is urged into an advanced position by the spring 74 to hold the dump valve 76 closed and the isolating valve 77 open. The plunger 40 is in an inoperative, retracted, position retained by seal friction.

When the brake 52 is to be applied fluid from the master cylinder 9 is supplied to the brakes 6, 7 through the chamber 64, the open isolating valve 77, the passage 51 and the chamber 60. The pressure also acts against the drive piston 43 to tend to urge it, and the pump plunger 40, towards the ring 42. However this is opposed by the fluid pressure acting over the annular area of chamber 60, defined between the seals 48 and 49, so that the drive piston 43 is held against a stop and the pump 32 remains disabled.

If the angular deceleration of a braked wheel exceeds a predetermined value, a skid signal is produced and the coil 72 is energised to withdraw the armature 73 against the force in the spring 74. In sequence this opens the dump valve 76 to connect the brake 6, 7 to the reservoir 65, and permits the isolating valve 77 to close under the load in the spring 87. This results in the reduction of the brake-applying pressure, and the isolation of the master cylinder 9 from the brakes 6, 7 respectively.

The release of fluid-pressure from the chamber 60 causes the plunger 40 to become unbalanced and the pressure from the master cylinder 9 can then drive the piston 43 and the plunger 40 towards the ring 42. Thus the plunger 40 is reciprocated in the bore 41 by the ring 42 which, in turn, is oscillated by rotation of the shaft 34.

As the plunger 40 is moved towards the ring 42, fluid from the reservoir 65 is drawn into the increasing volume of the chamber 52 past the seal 49 with flow taking place through the passages 58 and 59, and fluid is pumped from the chamber 60 into the pasage 51, since the first one-way valve 54 is closed, and from whence it is returned to the reservoir 65 through the still open dump valve 76. As the plunger 40 is moved in the opposite direction the face 56 of the seal 49 seals against the adjacent face of the groove 55 so that fluid is displaced from the chamber 52, and into the chamber 53, through the first one-way valve 54, which opens.

Whilst the dump valve 76 remains open fluid is pumped by the pump 2 in a closed circuit from the reservoir 65, to which it is returned.

At the termination of the skid signal, the spring 74 urges the armature axially to close the dump valve 76 thereby isolating the pump 32 and the brakes 6, 7 from the reservoir 65. However the isolating valve 77 remains shut and is prevented from opening by the pressure from the master cylinder 9 which acts to hold the head 83 against the seating 84, with movement of the armature 73 relative to the head 77 being accommodated by the lost-motion connection comprising the clearance between the stem 85 and the lower end of the valve head 83.

The pump 32 continues to operate to increase the pressure applied to the brakes 6, 7 at a controlled rate until that pressure applied to the brakes 6, 7 either causes another skid or becomes substantially equal to the output pressure from the master cylinder 9.

In the former case the cycle described above will be repeated to relieve the pressure applied to the brake until a similar stage in the cycle is again attained.

In the latter case, when substantially equal pressures are applied to opposite sides of the head 83, since the spring 86 is stronger than the spring 87, the isolating valve 77 will open to re-connect the master cylinder 9 to the brakes 6, 7. The pump 32 is again stalled with the plunger 40 being held away from the ring 42 by the fluid-pressure acting over the annular area of the chamber 60.

When the brake is released with the isolating valve 77 in a closed position, the isolating valve 77 will open substantially upon release of the pressure from the master cylinder 9.

In the construction described above the isolating valve 77 remains closed and a source separate from the master cylinder 9, namely the pump 32, is cycled to re-apply the brakes 6, 7 at a controlled rate.

The system described above may be provided with a "hold" feature to ensure that the dump valve 76 can open only when a skid is genuine.

This can be achieved by giving the solenoid a cycle of 10 ms to permit the isolating valve 77 to close but prevent a full reduction in brake pressure. Once this cycle has been completed the brake 6, 7 are re-applied at a rate determined by the pump 32. If the skid signal persists indicating that the skid is genuine then the dump valve 76 re-opens to relieve the brake-pressure.

A brake-pressure apportioning valve 20 is positioned in the pipe-line 14 between the modulator 12 and the brake 8, and a brake-pressure apportioning valve 21 is positioned in the pipe-line 18 between the modulator 16 and the brake 7. The valves 20 and 21 are of known construction and incorporate means to ensure that the front wheels will lock before the rear wheels, for given co-efficients of friction of the linings.

The behaviour of each wheel 1, 2, 3, 4, namely deceleration and/or slip is sensed by respective sensors 25, 26, 27, 28 which emit skid signals, and the skid signals are supplied to the electronic control module 29 which, in turn, is operative to emit an electric current to operate the solenoid-operated dump valve 76 of one of the modulators in order to relieve the pressure of fluid supplied to the two respective brakes.

When a skid signal is emitted by either of the sensors 25 or 26, the control module 29 is operative to emit an electric current to the dump valve 76 of the the respective modulator 12, 16 whereby to relieve and re-apply at a controlled rate, the brakes of the two wheels of that circuit.

When a skid signal is emitted by either of the sensors 27 or 28 indicative that the co-efficients of friction of the linings have departed from their given values, the control module 29 incorporates means arranged to ignore that signal, and only to operate the dump valve 26 one of the modulators upon receipt of a similar signal from the sensor on the other rear wheel. In this connection, after a skid signal is emitted by the said one sensor, the control module 19 incorporates means which downgrades its threshold so that it is operative to operate a modulator in response to a signal from the sensor on the other wheel which is less than that which would otherwise be required to correct a skid condition. Thus the brakes are released earlier.

Either modulator can be operated dependng upon the braking requirements of a particular vehicle, irrespective of which sensor 7 or 8 first emitted a skid signal. Normally the second rear wheel to lock would be the first to be released, since on surfaces of split $\mu$ it is desirable to maintain the braking effect of the front wheel which is running on the surface of higher $\mu$.

Figure 4:
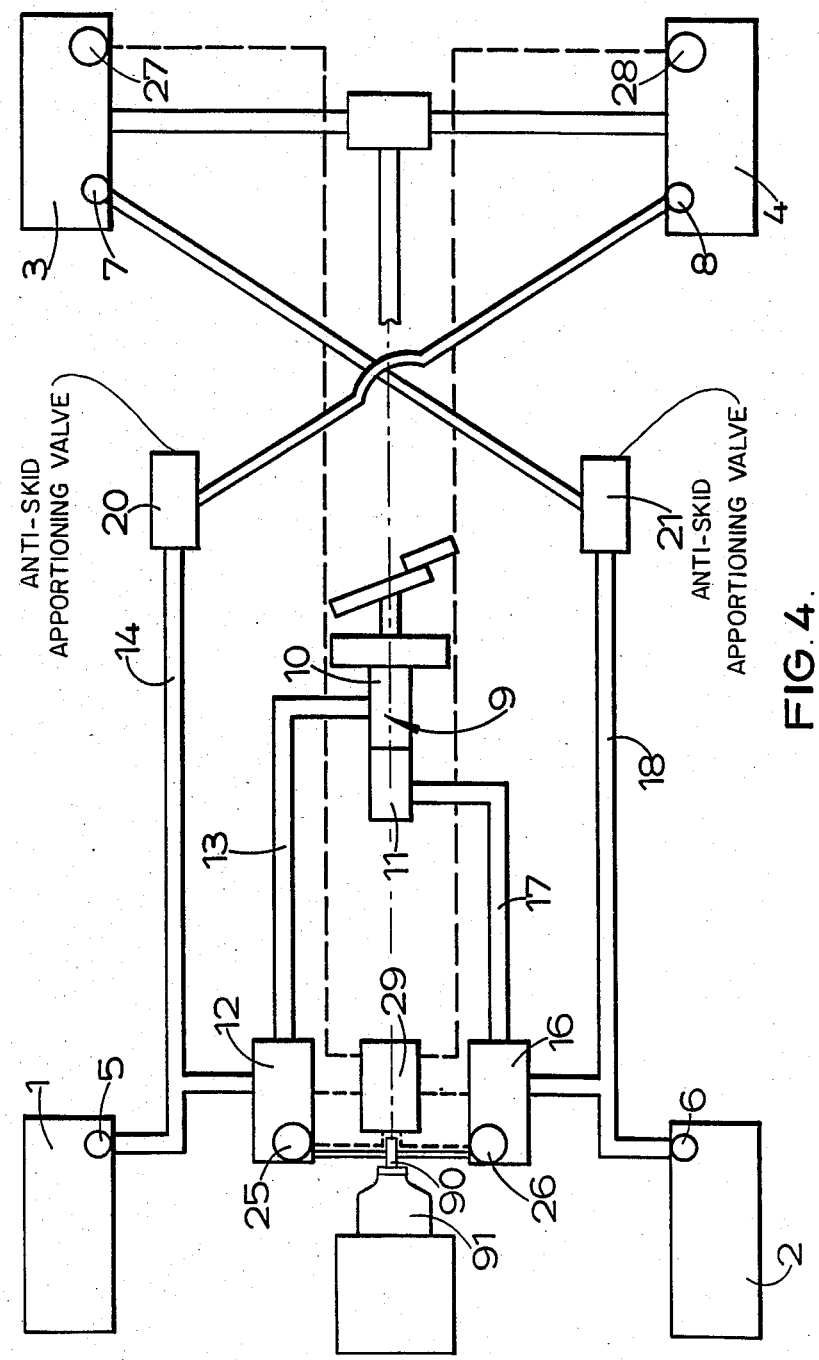
FIG. 4 is a layout of an "X" split system similar to FIG. 1 but showing a modification.

In the layout of FIG. 4, the vehicle is driven by the rear wheels 3, 4, and the two modulators 12, 16 are driven from the output shaft 90 of a gear box 91 for driving the rear wheels of the vehicle.

The construction and operation of the braking system of FIG. 4 is otherwise the same as that of FIG. 1 and corresponding reference numerals have been applied to corresponding parts.

We claim:

1. An anti-skid braking system for a four wheel vehicle having brakes on the front and rear wheels, wherein said system comprises first and seond brake-applying circuits, said first circuit comprising a first source of brake-applying fluid, and a first connection between the first source and the brake on one of said front wheels and the brake on the diagonally opposite one of said rear wheels, and the second circuit comprising a second source of brake-applying fluid, and a second connection between the brake on the other of said front wheels and the brake on the diagonally opposite other of said rear wheels, a first modulator located in said first connection for modulating the supply of fluid from said first source to both said brakes on the said one front wheel and said diagonally opposite rear wheel, a second modulator located in said second connection for modulating the supply of fluid from said second source to both said brakes on the said other front wheel and the said diagonally opposite other rear wheel, four skid sensors, each for providing a skid signal dependent upon the behaviour of a respective one of said wheels, a control module for operating at least one of said modulators in accordance with the nature of at least one skid signal, and apportioning valves disposed between said modulators and said brakes on said rear wheels, said control module being constructed and arranged to ignore a skid signal from said sensor on one of said rear wheels until a skid signal is also received from said sensor on the other of said rear wheels, whereafter said control module is operative to operate one of said two modulators.

2. A braking system as claimed in claim 1, wherein said control module has an adjustable threshold, and said control module is arranged such that, in response to a signal from said sensor of one of said rear wheels, the threshold of said control module is automatically reduced.

3. A braking system as claimed in claim 2 wherein said control module is adapted to shut down the system upon failure of a drive to one of said modulators.

4. A braking system as claimed in claim 1, wherein each said modulator is driven from the respective front wheel of a front wheel drive vehicle.

5. A braking system as claimed in claim 4, in wherein said modulator is operable to re-apply the brakes only when the wheel is rotating following correction of a skid.

6. A braking system as claimed in claim 5 wherein said control module is adapted to shut down the system upon failure of a drive to one of said modulators.

7. A braking system as claimed in claim 6 wherein said control module is adapted to shut down the system upon failure of a drive to one of said modulators.

8. A braking system as claimed in claim 1, wherein each said modulator is driven through a drive fom the output shaft of a gear box of a rear wheel drive vehicle.

9. A braking system as claimed in claim 8 wherein said control module is adapted to shut down the system upon failure of a drive to one of said modulators.

10. A braking system as claimed in claim 1 wherein said control module is adapted to shut down the system upon failure of a drive to one of said modulators.

* * * * *